July 31, 1945. L. HECKATHORN 2,380,594
IMPLEMENT CONSTRUCTION
Filed June 6, 1941
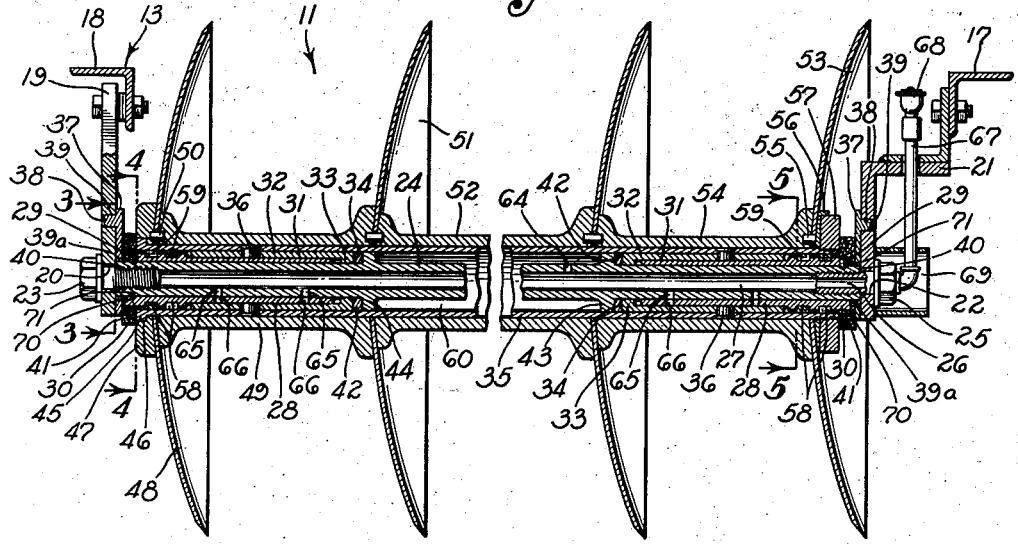
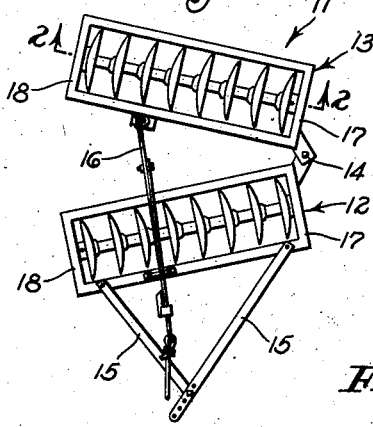
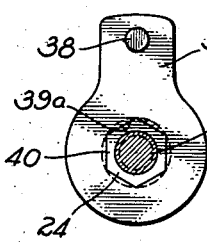
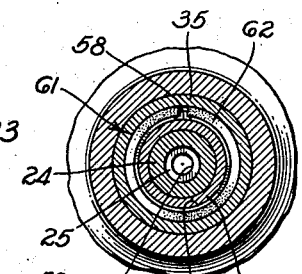
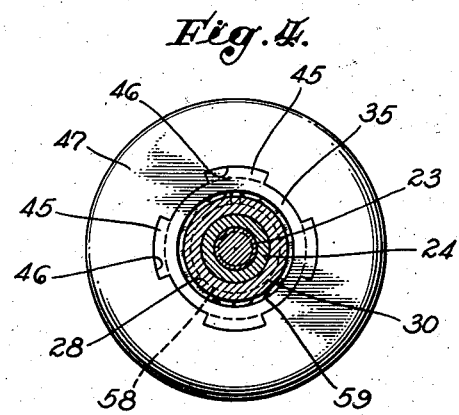
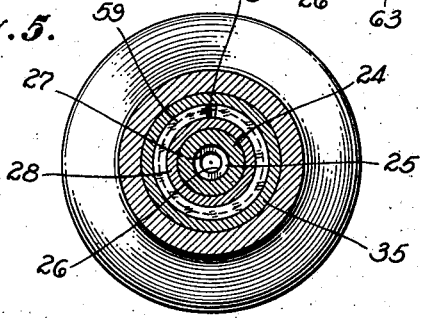
INVENTOR.
LOYD HECKATHORN
BY HARRIS, KIECH, FOSTER & HARRIS
FOR THE FIRM
ATTORNEYS.

Patented July 31, 1945

2,380,594

UNITED STATES PATENT OFFICE 2,380,594

IMPLEMENT CONSTRUCTION

Loyd Heckathorn, Garden Grove, Calif., assignor to Howard B. Rapp and Sally Rapp, Santa Ana, Calif., copartners doing business as Towner Manufacturing Co.

Application June 6, 1941, Serial No. 396,797

19 Claims. (Cl. 308—19)

This invention relates to implement constructions for working the ground, and, since it finds particular utility in its application to disc harrows, the embodiment thereof adapted for such use will be hereinafter described without limiting the invention to such embodiment or to such use.

In disc harrows of ordinary construction the discs during working operation exert a very considerable axial thrust upon the supporting shaft or axle, requiring means for transmitting this thrust from the discs to the implement frame. Rotary bearing means are also required between the discs or the disc-supporting element and the axle. Forces of very considerable magnitude are transmitted through both the rotary bearing means and the thrust bearing means, and both of these bearing means must be well lubricated to prevent their excessive wear. The difficulty of providing constant lubrication for such bearing means is increased by the loose soil turned by the discs into contact with the axle and the housing supporting or extending between the discs, and the tendency of such loose soil to enter such rotary and thrust bearing means and by its abrasive action to quickly destroy them.

It is an object of this invention to provide a disc harrow construction including a thrust bearing for transmitting axial thrust between the discs and the frame, which thrust bearing is easily manufactured and assembled and made wear resistant by the provision of a reservoir of lubricant in position to constantly bathe the thrust bearing during use of the harrow.

Another object of this invention is to provide such a construction which includes rotary bearings between the disc or disc-supporting member and the axle so located with respect to a reservoir of lubricant as to be constantly bathed with lubricant during the use of the harrow.

Still another object of this invention is to provide an implement construction which includes a reservoir or chamber for a body of lubricant positioned to continuously lubricate the thrust and rotary bearing surfaces, which reservoir accommodates a large body of lubricant, thus minimizing the frequency at which lubricant within the reservoir must be replenished.

Another object of this invention is to provide an implement having such a reservoir of lubricant for continuously washing the bearing surfaces with lubricant, in which construction sealing or packing means are provided for the reservoir which are efficient in operation, inexpensive to manufacture, and easy to replace.

Other objects of this invention include the provision of an implement construction in which those parts having bearing surfaces subjected to wear are made simple in form and of comparatively small size, so that they may be inexpensively made of hardened steel and easily and inexpensively replaced if required.

An embodiment of this invention capable of performing the objects and providing the advantages primarily stated is described in the following specification, which may be better understood by reference to the accompanying drawing in which Fig. 1 is a plan view of a disc harrow in working position;

Fig. 2 is a fragmentary sectional view taken as indicated by the line 2—2 of Fig. 1;

Fig. 3 is a transverse sectional view taken as indicated by the line 3—3 of Fig. 2;

Fig. 4 is a transverse sectional view taken as indicated by the line 4—4 of Fig. 2;

Fig. 5 is a transverse sectional view taken as indicated by the line 5—5 of Fig. 2; and Fig. 6 is a sectional view similar to Fig. 5, illustrating an alternative form of packing means adapted for use in the implement construction of this invention.

Referring to the drawing, which is for illustrative purposes only, the numeral 11 indicates an offset disc harrow including a front frame 12 and a rear frame 13 connected for relative swinging movement in a horizontal plane by a vertical pivot 14. The front frame 12 is provided with steadily converging drawbars 15 by which the harrow 11 is connected to a tractive vehicle. The harrow 11 includes also a stay bar 16 pivoted to the rear frame 13 and releasably connected to the front frame 12 for retaining the frames 12 and 13 in their desired angled or working position. Each of the frames 12 and 13 includes side frame members 17 and 18 to which the tool-supporting construction with which this invention is more particularly concerned is connected.

As may readily be seen by reference to Fig. 2, a riser plate 19 is secured to the side frame member 18 of either of the frames 12 or 13 and depends therefrom, the plate being provided with a cylindrical opening 20 adjacent its lower end. Secured to the other side member 17 is a riser angle 21, likewise provided with a cylindrical opening 22 adjacent its lower end. With harrow frames differing in the details of construction it is sometimes desirable to employ two riser plates like the riser plate 19 or two riser angles like the riser angle 21, instead of one plate and one angle as illustrated in the drawing.

A cap screw 23 is extended through the cylindrical opening 20 in the riser plate 19 and threaded into an axle 24 which extends between the riser plate 19 and the riser angle 21. A cap screw 25 is likewise extended through the riser angle 21 and threaded into the end of the axle 24, the cap screw 25 being provided with an oil duct 26 therethrough, communicating with a cylindrical bore 27 of the axle 24.

Mounted upon the axle 24 adjacent each end thereof is a first bearing member or inner sleeve 28. Each of the inner sleeves 28 is non-rotatably secured to the axle 24 by a set screw 29 extending through an enlarged portion 30 of the inner sleeve 28, provided at its outer end, and engaging the axle 24. Each of the inner sleeves 28 inwardly of the enlarged portion 30 is provided with a rotary bearing surface 31.

Rotatably mounted upon the rotary bearing surface 31 of each of the inner sleeves 28 is a second rotary bearing member or outer cylindrical sleeve 32, which is provided at its inner end with an inwardly extending radial flange 33 providing an annular vertical thrust bearing surface 34.

Mounted upon the outer sleeves 32 is a tubular housing 35. The housing 35 is non-rotatably secured to the outer sleeves 32 by pins 36, one of which extends through the tubular housing 35 into each of the sleeves 32 and which may be held in place by being welded to the tubular housing 35.

The axle 24 is prevented from rotating by axle lock members 37, one of which engages the inner surface of the riser plate 19 and another of which engages the inner surface of the riser angle 21, and each of which is provided with a horizontal pin 38 extending through an opening 39 formed in the plate or angle with which it is associated. The lower ends of the lock members 37 are provided with an opening 39a of noncircular outline adapted for engaging all or a portion of the periphery of an end portion 40 of the axle 24 formed of similar non-circular outline.

Positioned upon the enlarged portions 30 of the inner sleeves 28 and confined between the axle locking members 37 and the ends of the tubular housing 35 is a sealing or packing means 41 in the form of rings or washers of leather or the like. The sealing means 41 prevents the entrance of dirt and foreign matter between the ends of the tubular housing 35 and the inner sleeves 28, and between the ends of the inner sleeves 28 and the axle locking members 37.

Mounted upon the axle 24 in position to engage the thrust bearing surface 34 of the outer sleeves 32 is a thrust washer 42. Formed on the axle 24 are two outwardly extending annular flanges 43 and 44 positioned to each engage a thrust washer 42 and to transmit axial thrust from the tubular housing 35 through the outer sleeves 32 and the thrust washer 42 to the axle 24. The annular flanges 43 and 44 thus act as a first thrust member, and the flanges 33 on the outer sleeves 32 act as a second thrust member, the two thrust members cooperating to provide a thrust-transmitting means.

As is best illustrated in Fig. 4, one end of the tubular housing 35 is provided with radially extending projections 45, which are received in correspondingly shaped openings 46 in an end washer 47 slidably positioned upon the tubular housing 35 and held against rotation thereon by the projections 45. The inner face of the washer 47 is concave to receive the convex side of a disc 48. The concave side of the disc 48 is engaged by the convex end of a spacer sleeve 49, there being a pin 50 extending through the disc 48 and projecting into the end washer 47 holding the disc 48 and the spacer sleeve 49 against rotation relative to the end washer 47. The opposite end of the spacer sleeve 49 is concave to engage the convex side of a second disc 51, the concave side of which is engaged by the convex end of a second spacer sleeve 52. The spacer sleeves and discs, like the spacer sleeves 49 and 52 and the discs 48 and 51, are alternated along the tubular housing 35 in the desired number.

Projecting through the end disc, indicated by the numeral 53, and extending into the concave end of the end spacer sleeve, indicated by the numeral 54, is a pin 55 having a radially directed portion 56 adjacent the concave side of the disc 53. A nut 57 is threaded upon the tubular housing 35 against the pin 55 and the end disc 53 and is locked in position thereon by the radially directed portion 56 being bent over the peripheral edge of the nut 57. By proper adjustment of the nut 57 the various spacer sleeves and discs are firmly clamped together against the end washer 47 and are prevented from rotating relative to the tubular housing 35 by the pins 50 and 55 and the engagement of the end washer 47 with the radial projections 45 of the tubular housing 35.

Formed in the outer wall of the enlarged portion 30 of each of the inner sleeves 28 is a group of two annular recesses 58. Positioned in each of the annular recesses 58 is a sealing or packing means or member 59. Each packing member 59 may be formed of oil resistant material, such as neoprene, woven or pressed compositions of fibrous material, or metal, and is formed preferably of material which is both resilient and deformable, such as cork or the like, and is of a width substantially equal to the width of the recess 58 in which it is disposed so that its lateral edges engage the side walls of the recess. The packing member may be in the form of a spiral or coil or a ring made from a strip of material with its ends abutting or in proximity to each other, all such forms being referred to as annuli or substantially complete annuli. Due to its resilience, each packing member 59 engages the side walls and the outer wall of the annular recess 58 in which it is disposed, which is provided by the tubular housing 35, and rotates with the tubular housing 35, and thus seals the space between the inner sleeve 28, the tubular housing 35, and the axle 24, which space is indicated by the numeral 60 and acts as a second oil reservoir or chamber.

As illustrated in Fig. 6, instead of utilizing a packing member 59 made of resilient material, a packing member as indicated by the numeral 61 may be employed, which includes an outer sealing ring 62 and an inner spring means 63 resiliently urging the sealing ring 62 into engagement with the inner wall of the tubular housing 35, defining the outer wall of the recess 58. In this embodiment of sealing member the sealing ring 62 is preferably made of deformable material which need not be resilient, although material which is both deformable and resilient may be employed if desired.

The axle 24 is provided with a passage 64 therein connecting the first lubricant chamber 27 and the second lubricant chamber 60. A plurality of passages 65 are formed in the axle 24, registering with passages 66 provided in the inner sleeve 28 for conveying lubricant from the first lubricant chamber 27 to the engaging surfaces of the inner sleeve 28 and the outer sleeve 32, which surfaces constitute the rotary bearing of the invention.

For supplying lubricant to the chambers 27 and 60 an oil pipe riser 67 is threaded into the cap screw 25, connecting the oil duct 26 therein with a grease fitting 68 of conventional type, which is adapted for detachable connection with a pressure device for supplying lubricant thereto and which, when fluid pressure from such a pressure device is relieved, automatically closes to prevent the escape of lubricant therefrom. The oil pipe riser extends upwardly a substantial distance so that the grease fitting 68 is above most of the soil turned by the disc 53. If desired, a shell member 69 may be positioned around the outer end of the cap screw 25 and its connection to the oil pipe riser 67 and detachably secured to the riser angle 21 for sealing such elements from the earth turned by the disc 53.

From the foregoing it will be apparent that, as the discs 48, 51, and 53 turn, the oil is transmitted from the tubular tool-supporting member, which includes the tubular housing 35 and the outer sleeves 32, to the shaft member, which includes the inner sleeves 28 and the axle 24, and by the axle 24 through the riser plate 19 and riser angle 21 to the frame members 18 and 17 respectively.

Axial thrust tending to move the discs 48, 51, and 53, the tubular housing 35, and the outer sleeves 32 to the left, as viewed in Fig. 2, relative to the inner sleeves 28 and the axle 24 is transmitted, and such relative movement is prevented by the thrust bearing or transmitting means, including the first thrust member 43; radial thrust in the opposite direction tending to cause such relative movement to the right, as viewed in Fig. 2, is resisted by the thrust bearing or thrust-transmitting means, which includes the first thrust member 44. It will thus be seen that axial thrust in both directions is transmitted from the discs to the frame and that axial movement of the discs, the tubular housing 35, and outer sleeves 32 relative to the inner sleeves 28 and axle 24 is prevented.

Since the rotary bearing is provided by the outer sleeves 32 and the inner sleeves 28, and the wear of the thrust bearing occurs principally on the thrust bearing surfaces 34 of the outer sleeves 32 and the thrust washer 42, it is necessary to make only the inner sleeves 28, outer sleeves 32, and thrust washer 42 of hardened steel. As these parts are relatively small and simple in form, it will be apparent that by this invention an implement construction has been provided in which the parts having the bearing surfaces subjected to wear may be inexpensively manufactured and easily and quickly replaced.

The sealing members 59, by their engagement with the side walls of the recess 58 and their resilient engagement with the inner surface of the tubular housing 35, effectively seal the second oil chamber 60 and first oil chamber 27 against the escape of lubricant therefrom and the entrance of abrasives thereto. The entrance of abrasives to the oil chambers is further prevented by the packing means 41, and, if found desirable, by an auxiliary packing element 70 positioned in an annular recess 71 formed in the outer end of each of the inner sleeves 28 around the axle 24. It will thus be seen that by this invention there has been provided an implement construction including means for sealing a body of lubricant for continuous lubrication during use of the implement, which means is most efficient in operation and inexpensive in manufacture.

Further, by the provision of the registering passages 65 and 66, this invention has provided means for continuously supplying lubricant from a reservoir to the bearing surfaces during the use of the implement. Likewise, by the provision of the first lubricant chamber 27 within the axle 24 and the second lubricant chamber 60 between the axle 24 and the tubular housing 35, which chambers are in communication with each other, there is accomplished that object originally stated of providing in position to continuously lubricate the bearing members a large body of lubricant, thus minimizing the frequency with which the lubricant must be replenished.

While that embodiment of this invention herein illustrated and described is fully capable of performing the objects and providing the advantages primarily stated, and while that embodiment particularly adapted for use in offset disc harrows has been hereinbefore referred to, it is to be understood that this invention is not restricted to the specific embodiment herein illustrated and described or such particular use, but includes other uses and variations coming within the scope of the claims which follow.

I claim as my invention:

1. In an implement construction having side frame members, the combination of: a shaft member extending between said side frame members, having two enlarged portions providing rotary bearing surfaces and an intermediate reduced portion and having formed therein a first lubricant chamber; a tool-supporting member mounted on said enlarged portions of said shaft member, said members providing annular recesses therebetween outwardly of said rotary bearing surfaces; a first thrust member associated with said shaft member; a second thrust member associated with said tool-supporting member and engaging said first thrust member, said first and second thrust members being located between said recesses; and packing means in each of said recesses resiliently engaging the outer wall thereof and defining with said shaft member and said tool-supporting member a second lubricant chamber communicating with said first lubricant chamber.

2. In an implement having side frame members, the combination of: a non-rotatable shaft member extending between said side frame members; a tool-supporting member rotatably mounted on said shaft member; said members providing two groups of a plurality of annular recesses therebetween; a packing means in each of said recesses in the form of an annulus resiliently engaging the outer wall thereof, said packing means sealing the space between said members and defining with said members a lubricant storage reservoir; a first thrust member associated with said shaft member; and a second thrust member associated with said tool-suporting member and engaging said first thrust member during rotation of said tool-supporting member, said first and second thrust members being positioned between said groups of recesses and in said lubricant reservoir.

3. In an implement having side frame members, the combination of: a non-rotatable shaft member extending between said side frame members; a tool-supporting member rotatably mounted on said shaft member, said members providing two groups of a plurality of annular recesses therebetween; a packing means in each of said recesses in the form of an annulus resiliently engaging the outer wall thereof, said packing means sealing the space between said members and defining with said members a lubricant storage reservoir; a pair of first thrust members associated with said shaft member; and a pair of second thrust members associated with said tool-supporting member, each of said second thrust members so engaging one of said first thrust members that axial movement of said tool-supporting member relative to said shaft member is restrained in both directions, said first and second thrust members being positioned between said groups of recesses and in said lubricant reservoir.

4. In an implement construction having a frame adapted for connection to a tractive vehicle, the combination of: an axle non-rotatably connected to said frame; rotary bearing members secured to said axle and providing rotary bearing surfaces adjacent their inner ends; a tubular tool-supporting member rotatably mounted on said rotary bearing members, said rotary bearing members and said tool-supporting member providing annular recesses therebetween; thrust-transmitting means associated with said axle and said tool-supporting member adapted for transmitting axial thrust and for restraining relative axial movement therebetween in both directions; and packing means in the form of a resilient ring in each of said recesses resiliently engaging the outer wall thereof and sealing the space between said tool-supporting member and said bearing members and with said members and said axle defining a lubricant reservoir containing said rotary bearing surfaces and said thrust-transmitting means.

5. In an implement construction having a frame adapted for connection to a tractive vehicle the combination of: an axle non-rotatably connected to said frame; rotary bearing members secured to said axle and providing rotary bearing surfaces adjacent their inner ends; a tubular tool-supporting member rotatably mounted on said rotary bearing members, said rotary bearing members and said tool-supporting member providing annular recesses therebetween; thrust-transmitting means associated with said axle and said tool-supporting member adapted for transmitting axial thrust and for restraining relative axial movement therebetween in both directions; packing means in the form of a resilient ring in each of said recesses resiliently engaging the outer wall thereof and sealing the space between said tool-supporting member and said bearing members and with said members and said axle defining a lubricant reservoir containing said rotary bearing surfaces and said thrust-transmitting means; sealing means between said axle and said rotary bearing members, preventing the passage of abrasives therebetween; and sealing means at the outer ends of said rotary bearing members preventing the passage of abrasives inwardly between said rotary bearing members into contact with said packing means.

6. In an implement having a frame adapted for connection to a tractive vehicle, the combination of: an axle non-rotatably connected to said frame; first rotary bearing members secured to said axle; second rotary bearing members rotatably mounted on said first rotary bearing members; a tool-supporting sleeve secured to said second rotary bearing members and with said first rotary bearing members providing annular recesses therebetween; a thrust-transmitting means associated with said axle and said second rotary bearing members and adapted for transmitting axial thrust in both directions between said axle and said tool-supporting sleeve; and packing means in the form of a substantially complete annulus in each of said recesses resiliently engaging the outer wall thereof and sealing the space between said first rotary bearing members and said tool-supporting sleeve and with said members, said axle, and said tool-supporting sleeve defining a reservoir retaining a lubricant in position to bathe the engaging surfaces of said first and second bearing members and the engaging surfaces of said thrust-transmitting means.

7. In an implement having a frame adapted for connection to a tractive vehicle, the combination of: an axle non-rotatably connected to said frame; first rotary bearing members secured to said axle, each of said rotary bearing members providing an inner rotary bearing surface and an outer enlarged portion; second rotary bearing members rotatably mounted on said rotary bearing surfaces of said first rotary bearing members; a tool-supporting sleeve secured to said second rotary bearing members and with said enlarged portions of said first rotary bearing members providing annular recesses therebetween; a thrust-transmitting means associated with said axle and said second rotary bearing members and adapted for transmitting axial thrust in both directions between said axle and said tool-supporting sleeve; and packing means in the form of an annulus in each of said recesses resiliently engaging the outer wall thereof and sealing the space between said first rotary bearing members and said tool-supporting sleeve, and with said members, said axle, and tool-supporting sleeve defining a reservoir retaining a lubricant in position to bathe the engaging surfaces of said first and second bearing members and the engaging surfaces of said thrust-transmitting means.

8. In an implement having a frame adapted for connection to a tractive vehicle, the combination of: an axle non-rotatably connected to said frame; first rotary bearing members secured to said axle near its connections to said frame, each of said members providing adjacent its inner end a rotary bearing surface; second rotary bearing members rotatably mounted on said rotary bearing surfaces of said first bearing members, each of said second rotary bearing members having at its inner end a thrust bearing surface; a tool-supporting sleeve secured to said second rotary bearing members and with said first rotary bearing members providing annular recesses therebetween spaced outwardly from said rotary bearing surfaces; a thrust washer rotatably mounted upon the said axle and engaging said thrust bearing surface of each of said second rotary bearing members; a thrust-transmitting member associated with said axle and engaging each of said thrust washers, whereby axial thrust is transmitted in both directions between said tool-supporting sleeve and said axle; and packing means in the form of a substantially complete annulus in each of said recesses resiliently engaging the outer wall thereof and sealing the space between said first rotary bearing members and said tool-supporting sleeve and defining within said tool-supporting sleeve a lubricant reservoir containing said rotary bearing surfaces and said thrust bearing surfaces.

9. In an implement having a frame adapted for connection to a tractive vehicle, the combination of: an axle non-rotatably connected to said frame, said axle having therein a first lubricant chamber intermediate its ends; first rotary bearing members non-rotatably secured to said axle near its connections to said frame, each of said bearing members having an inner rotary bearing surface and being provided with annular recesses outwardly of such rotary bearing surface; second rotary bearing members rotatably mounted upon said rotary bearing surfaces of said first rotary bearing members, each of said second rotary bearing members having on its inner end a thrust bearing surface; a tool-supporting sleeve secured to said second rotary bearing members; a thrust-transmitting member extending inwardly of said tool-supporting sleeve and adapted for engagement with said thrust bearing surfaces, whereby axial movement of said tool-supporting sleeve and said axle is restrained; packing means in the form of an annulus in each of said recesses resiliently engaging the inner wall of said tool-supporting sleeve and defining between said axle and said tool-supporting sleeve a second lubricant chamber containing said thrust bearing surfaces and said rotary bearing surfaces, said axle having therein an opening connecting said first and second lubricant chambers, one of said chambers being provided with an inlet opening for the supply of a lubricant thereto; and means for closing said inlet opening against the entrance of foreign matter thereto and the escape of lubricant therefrom.

10. In an implement construction having side frame members, the combination of: a shaft member extending between said side frame members, having two enlarged portions providing bearing surfaces and an intermediate reduced portion and having formed therein a first lubricant chamber; a tool-supporting member mounted on said enlarged portions of said shaft member; a first thrust member associated with said shaft member; and a second thrust member associated with said tool-supporting member and engaging said first thrust member.

11. In an implement having a frame adapted for connection to a tractive vehicle, the combination of: an axle non-rotatably connected to said frame; first rotary bearing members secured to said axle; second rotary bearing members rotatably mounted on said first rotary bearing members; a tool-supporting sleeve secured to said second rotary bearing members; a thrust-transmitting means associated with said axle and said second rotary bearing members and adapted for transmitting axial thrust in both directions between said axle and said tool-supporting sleeve; and packing means with said members, said axle, and said tool-supporting sleeve defining a reservoir retaining a lubricant in position to bathe the engaging surfaces of said first and second bearing members and the engaging surfaces of said thrust-transmitting means.

12. In an implement having a frame adapted for connection to a tractive vehicle, the combination of: an axle non-rotatably connected to said frame; first rotary bearing members secured to said axle near its connections to said frame, each of said members providing adjacent its inner end a rotary bearing surface; second rotary bearing members rotatably mounted on said rotary bearing surfaces of said first bearing members, each of said second rotary bearing members having at its inner end a thrust bearing surface; a tool-supporting sleeve secured to said second rotary bearing members; a thrust washer rotatably mounted upon the said axle and engaging said thrust bearing surface of each of said second rotary bearing members; a thrust-transmitting member associated with said axle and engaging each of said thrust washers, whereby axial thrust is transmitted in both directions between said tool-supporting sleeve and said axle; and packing means sealing the space between said first rotary bearing members and said tool-supporting sleeve and defining within said tool-supporting sleeve a lubricant reservoir containing said rotary bearing surfaces and said thrust bearing surfaces.

13. In an implement having a frame adapted for connection to a tractive vehicle, the combination of: an axle non-rotatably connected to said frame, said axle having therein a first lubricant chamber intermediate its ends; first rotary bearing members non-rotatably secured to said axle near its connections to said frame, each of said bearing members having an inner rotary bearing surface; second rotary bearing members rotatably mounted upon said rotary bearing surfaces of said first rotary bearing members, each of said second rotary bearing members having on its inner end a thrust bearing surface; a tool-supporting sleeve secured to said second rotary bearing members; a thrust-transmitting member extending inwardly of said tool-supporting sleeve and adapted for engagement with said thrust bearing surfaces, whereby axial movement of said tool-supporting sleeve and said axle is restrained; packing means defining between said axle and said tool-supporting sleeve a second lubricant chamber containing said thrust bearing surfaces and said rotary bearing surfaces, said axle having therein an opening connecting said first and second lubricant chambers, one of said chambers being provided with an inlet opening for the supply of a lubricant thereto; and means for closing said inlet opening against the entrance of foreign matter thereto and the escape of lubricant therefrom.

14. In an implement construction having side frame members, the combination of: a single shaft member extending between said side frame members; a tool-supporting member mounted on said shaft member, one of said members having channels therein; a first thrust member associated with said shaft member; a second thrust member associated with said tool-supporting member and engaging said first thrust member, said first and second thrust members being located between said channels; and substantially annular packing means projecting from each of said channels into resilient engagement with the other of said members and defining with said shaft member and said tool-supporting member a lubricant chamber.

15. In an implement construction having side frame members, the combination of: a single shaft member extending between said side frame members and having formed therein a first lubricant chamber; a tool-supporting member mounted on said shaft member, one of said members having channels therein; a first thrust member associated with said shaft member; a second thrust member associated with said tool-supporting member and engaging said first thrust member, said first and second thrust members being located between said channels; and resilient packing means projecting from each of said channels into resilient engagement with the other of said members and defining with said shaft member and said tool-supporting member a second lubricant chamber communicating with said first lubricant chamber.

16. In an implement construction having side frame members, the combination of: a shaft member extending between said side frame members, having two enlarged portions and an intermediate reduced portion, and having formed therein a first lubricant chamber; a tool-supporting member mounted on said enlarged portions of said shaft member, one of said members having channels therein; a first thrust member associated with said shaft member; a second thrust member associated with said tool-supporting member and engaging said first thrust member, said first and second thrust members being located between said channels; and packing means projecting from each of said channels into resilient engagement with the other of said members and defining with said shaft member and said tool-supporting member a second lubricant chamber communicating with said first lubricant chamber.

17. In an implement construction having side frame members, the combination of: a shaft member extending between said side frame members and having formed therein a first lubricant chamber; a tool-supporting member mounted on said shaft member, one of said members having grooves therein; a first thrust member associated with said shaft member; a second thrust member associated with said tool-supporting member and engaging said first thrust member, said first and second thrust members being located between said grooves; packing means projecting from each of said grooves into engagement with the other of said members and defining with said shaft member and said tool-supporting member a second lubricant chamber communicating with said first lubricant chamber, one of said chambers being provided with an inlet opening for the supply of lubricant thereto; and means for closing said inlet opening against the entrance of foreign matter thereto and the escape of lubricant therefrom.

18. In an implement construction, the combination of: a non-rotatable shaft member; a tool-supporting member rotatably mounted on said shaft member, one of said members having grooves therein; packing means in the form of an expansible, substantially complete ring in each of said grooves resiliently engaging the other of said members and sealing the space between said members and defining with said members a lubricant reservoir; and thrust-transmitting means associated with each of said members within said reservoir and adapted for transmitting axial thrust from said tool-supporting member to said shaft member and for restraining said tool-supporting member against axial movement in both directions relative to said shaft member.

19. A combination according to claim 15 wherein the packing means includes annularly disposed packing material and a split spring metal ring underlying said material and urging the same into said resilient engagement.

LOYD HECKATHORN.